(12) United States Patent
Damen et al.

(10) Patent No.: US 7,970,048 B2
(45) Date of Patent: Jun. 28, 2011

(54) METHOD OF SYSTEMATIC CONSTRUCTION OF SPACE-TIME CONSTELLATIONS, SYSTEM AND METHOD OF TRANSMITTING SPACE-TIME CONSTELLATIONS

(75) Inventors: Mohamed O. Damen, Edmonton (CA); Norman C. Beaulieu, Edmonton (CA); Hesham El Gamal, Dublin, OH (US)

(73) Assignees: University of Alberta, Edmonton, Alberta (CA); The Ohio State University, Columbus, OH (US)

( * ) Notice: Subject to any disclaimer, the term of this patent is extended or adjusted under 35 U.S.C. 154(b) by 0 days.

(21) Appl. No.: 12/497,129

(22) Filed: Jul. 2, 2009

(65) Prior Publication Data

US 2009/0285332 A1 Nov. 19, 2009

Related U.S. Application Data

(63) Continuation of application No. 11/095,430, filed on Mar. 31, 2005, now Pat. No. 7,583,747.

(60) Provisional application No. 60/558,263, filed on Mar. 31, 2004.

(51) Int. Cl.
*H04N 7/12* (2006.01)

(52) U.S. Cl. .......... 375/240; 704/500; 710/68; 382/276; 382/232; 382/118; 382/119; 382/113

(58) Field of Classification Search .................. 375/267, 375/257, 219, 295, 316; 714/794, 795
See application file for complete search history.

(56) References Cited

U.S. PATENT DOCUMENTS 6,898,248 B1 * 5/2005 Elgamal et al. ............... 375/259
2004/0132413 A1 * 7/2004 Hwang et al. .................. 455/73

OTHER PUBLICATIONS

Space-Time Constellations Matched to the Receiver; Damen, Mohamed Oussama et al., IEEE Globecom, San Francisio, California, pp. 3331-3334, Dec. 1-5, 2003.
Near-Optimal Linear Space-Time Constellations; Damen, Mohamed Oussama et al., IEEE International Symposium on Information Theory (ISIT 2003) Yokohama, Japan, p. 241, Jun. 29-Jul. 4, 2003.
Approaching the Fundamental Limits of Linear Space-Time Constellations; Damen, Mohamed Oussama et al., Wireless '03, Calgary, Alberta, pp. 34-39, Jul. 7-9, 2003.

(Continued)

*Primary Examiner* — David C. Payne
*Assistant Examiner* — Zewdu Kassa
(74) *Attorney, Agent, or Firm* — Gordon & Jacobson, PC

(57) ABSTRACT

Space-time code, and methods for constructing space-time codes are provided. The space-time coder performs a respective linear transformation on each of P sets of K modulated symbols of a modulated symbol stream to produce P sets of T linearly transformed symbols, applies a respective phase rotation to each set of T linearly transformed symbols to produce a respective set of T phase rotated symbols, and performs a threading operation on the sets of T phase rotated symbols to produce P threaded sequences that define M output sequences. During each of T symbol periods, a respective one of the P threaded sequences includes a symbol from one of the P sets of phase rotated symbols. At least one symbol from each set of phase rotated symbols appears in each output sequence, where $M>=2$, $2<=P<=M$, and $T>=M$ and $M>=K$.

16 Claims, 3 Drawing Sheets

OTHER PUBLICATIONS

On Optimal Linear Space-Time Constellations; Damen, Mohamed Oussama et al., IEEE International Conference on Communications, Anchorage, Alaska, pp. 2276-2280, May 11-15, 2003.

A Simple Transmit Diversity Technique for Wireless Communications; Alamouti, Siavash M., IEEE Journal on Select Areas in Communications, vol. 16, No. 8, Oct. 1998, pp. 1451-1458.

Linear Threaded Algebraic Space-Time Constellations; Damen, Mohamed O. et al, IEEE Transactions on Information Theory, vol. 29, No. X, 2003.

Systematic Constructions of Full Diversity Algebraic Constellations; Damen, Mohamed O. et al, IEEE Transactions on Information Theory 2003 (revised).

* cited by examiner

METHOD OF SYSTEMATIC CONSTRUCTION OF SPACE-TIME CONSTELLATIONS, SYSTEM AND METHOD OF TRANSMITTING SPACE-TIME CONSTELLATIONS

RELATED APPLICATION

This application is a continuation of U.S. application Ser. No. 11/095,430, filed Mar. 31, 2005, now U.S. Pat. No. 7,583,747 which claims the benefit of U.S. Provisional Application 60/558,263 filed Mar. 31, 2004, both of which are hereby incorporated herein in their entireties.

FIELD OF THE INVENTION

The invention relates to space-time constellations for use in MIMO (multiple-input, multiple-output) communications systems.

BACKGROUND OF THE INVENTION

Wireless channels are characterized by complex physical layer effects resulting from multiple users sharing spectrum in a multipath fading environment. In such environments, reliable communication is sometimes possible only through the use of diversity techniques in which the receiver processes multiple replicas of the transmitted signal under varying channel conditions. Antenna diversity techniques have received considerable attention recently due to the significant gains promised by information-theoretic studies. While the use of multiple receive antennas is a well-explored problem, the design of space-time (ST) signals that exploit the available capacity in multi-transmit antenna or multi-transmit/multi-receive antenna systems still faces many challenges. Tarokh et al. coined the name space-time coding for this two-dimensional signal design paradigm. Over the past five years, several ST coding schemes have been proposed in the literature.

The design of full diversity algebraic constellations for the Rayleigh-fading channel was pioneered by Boullé and Belfiore. The main idea behind their work is to introduce redundancy in the signal space (or signal space diversity) when the signal constellation is carved from some algebraic lattices. Signal space diversity can be obtained by applying fully diverse unitary transformations to inputs drawn from lattices or multidimensional digital modulation signals carved from a number ring, such as pulse amplitude modulation (PAM) or quadrature amplitude modulation (QAM) constellations. The resulting constellations have the property that each point is uniquely determined by any of its components which allows for the possibility of retrieving the whole point if some of the components are lost in a deep fade.

SUMMARY OF THE INVENTION

According to one broad aspect, the invention provides an apparatus comprising: a space-time coder adapted to perform a respective linear transformation on each of P sets of K modulated symbols of a modulated symbol stream to produce P sets of T linearly transformed symbols, to apply a respective phase rotation to each set of T linearly transformed symbols to produce a respective set of T phase rotated symbols, and to perform a threading operation on the sets of T phase rotated symbols to produce P threaded sequences that define M output sequences; the threading operation being such that each threaded sequence is an allocation of output sequences over time of a respective one of the P sets of T phase rotated symbols in which all of the output sequences are used by each threaded sequence; during each of T symbol periods, a respective one of the P threaded sequences includes a symbol from one of the P sets of phase rotated symbols; and at least one symbol from each set of phase rotated symbols appears in each output sequence; where $M \geq 2$, $2 \leq P \leq M$, and $T \geq M$ and $M \geq K$.

In some embodiments, the apparatus further comprises: M transmit antennas; wherein each output sequence is transmit from a respective one of the M transmit antennas.

In some embodiments, each antenna is used equally often to the extent possible having regard to the number of antennas M and the number of symbols T in each threaded sequence.

In some embodiments, the apparatus further comprises: a channel coder/modulator adapted to produce the modulated symbol stream from an input information stream.

In some embodiments, the linear transformations are all identical and unitary.

In some embodiments, the linear transformations comprise at least in part a DFT (discrete Fourier transform).

In some embodiments, each linear transformation is the product of a DFT and a diagonal matrix.

In some embodiments, each linear transformation is one of the optimized linear transformations defined by one or more of equations 10a, 10b, 10c and 10d.

In some embodiments, the phase rotations comprise $\phi_i = \phi^{i-1}$ $i=1, M$, for some value $\phi$.

In some embodiments, $\phi$ is as defined in Theorem 3.

In some embodiments, the space-time code is completely specified by the parameters M (the number of transmitter antennas), N (the number of receive antennas), T (the number of symbol periods, i.e. the code consists of M×T signalling matrices), P (the number of threads giving the rate of the code in symbols from the input alphabet per channel use; we set P=min (M,N) in order to achieve full rate), θ (the Diophantine number within each thread in the M×T space-time matrix) and φ (the Diophantine number between the threads).

In some embodiments, the parameters are in accordance with one of the sets in the following table:

TABLE

| M | N | T | P | θ | φ |
|---|---|---|---|---|---|
| 2 | 1 | 2 | 1 | exp(iπ/4) | 1 |
| 3 | 1 | 3 | 1 | exp(2π/5) | 1 |
| 4 | 1 | 4 | 1 | exp(iπ/8) | 1 |
| 2 | 2 | 2 | 2 | exp(iπ/4) | exp(iπ/6) |
| 4 | 2 | 4 | 2 | exp(iπ/8) | exp(iπ/6) |
| 3 | 3 | 3 | 3 | exp(2π/5) | exp(2π/7) |
| 4 | 4 | 4 | 4 | exp(iπ/8) | exp(iπ/32) |
| 6 | 6 | 6 | 6 | exp(2π/7) | exp(2π/42) |
| 8 | 4 | 8 | 4 | exp(iπ/16) | exp(iπ/64) |
| 10 | 5 | 10 | 5 | exp(2π/11) | exp(2π/55) |
| 12 | 12 | 12 | 12 | exp(2π/13) | exp(2π/156) |

In some embodiments, an apparatus is adapted to transmit a space-time code defined by equation 27 for a MISO channel.

In some embodiments, an apparatus is adapted to transmit a space-time code defined by one of equations 32, 33, 34, 35, 36 for MIMO channels.

In some embodiments, the apparatus is applied in a collaborative scheme in a wireless network.

In some embodiments, a storage and retrieval system comprising the apparatus as summarized above.

In some embodiments, an OFDM transmitter comprising the space-time coder as summarized above, wherein respective transmit sequences are transmitted on respective sub-carriers.

In some embodiments, an apparatus comprising a space-time coder equivalent to the space-time coder as summarized above.

According to another broad aspect, the invention provides a method of constructing a full diversity algebraic constellation for use with the structure of any preceding claim, the method comprising: selecting a parameterized linear transformation; performing an optimization or near-optimization of the parameterized linear transformation; performing a further optimization to determine phase rotations $\phi_i$, for i=0, ..., M−1.

In some embodiments, the parameterized linear transformation comprises a DFT multiplied by a diagonal matrix.

In some embodiments, the parameterized linear transformation is as defined in equation 10a.

In some embodiments, parameters include $\phi_1, \phi_2, \ldots, \phi_M$ used in the diagonal matrix diag $(\phi_1, \phi_2, \ldots, \phi_M)$.

In some embodiments, the diagonal matrix is defined as a function of a single parameter $\phi$.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Coding System Structure

Figure 1:
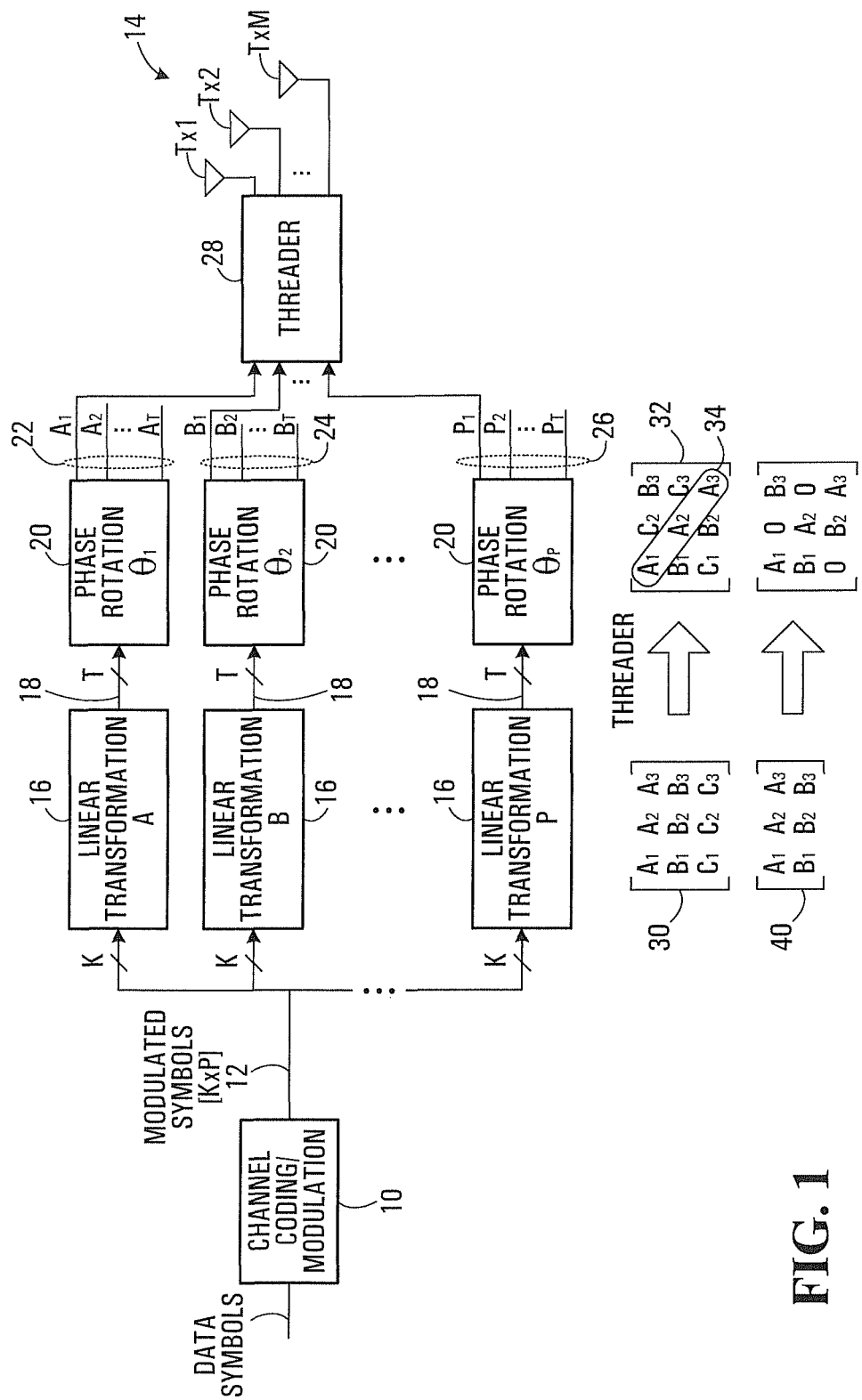
FIG. 1 is a block diagram of a space-time coding system provided by an embodiment of the invention.

Referring now to FIG. 1, shown is a block diagram of a space-time coding system provided by an embodiment of the invention. Data symbols (bits or otherwise) are input to a channel coding/modulation function 10 to produce modulated symbols 12 of an appropriate symbol alphabet. Examples of suitable alphabets include but are not limited to quadrature amplitude modulation, pulse amplitude modulation and phase shift keying. The system is an M×N MIMO system, meaning there are M transmit antennas, and N receive antennas. The M transmit antennas are indicated at 14. The receive antennas form part of a receiver (not shown). Sets of P×K symbols are processed at once by the functionality which follows the channel coding/modulation 10.

K symbols are input to each of P linear transformations 16 to produce a respective set 18 of T linearly transformed symbols, where T≧K. In preferred embodiments, the linear transformations 18 are all identical and unitary. Thus, a total of K×P symbols are processed at a time to produce K×T symbols. In a preferred embodiment, P (=number of linear transformations)=M (=number of antennas).

In a preferred embodiment, the linear transformation comprises at least in part a DFT (discrete Fourier transform). The effect of the linear transformation is to introduce correlation between each of the symbols output from the linear transformation. Other examples include repetition codes, and a combined unitary transformation and repetition code. Preferably, the linear transformation is selected to achieve diversity while ensuring linearity.

Preferably, the linear transformation is the product of a DFT and a diagonal matrix.

Each set of linearly transformed symbols is then subjected to a respective phase rotation, with the ith set undergoing a phase rotation of $\theta_i$. The output 22 of the first phase rotation is referred to as $A_1, \ldots, A_T$, the output 24 of the second phase rotation is referred to as $B_1, \ldots, B_T$, and so on, with the output 26 of the Pth phase rotation being referred to as $P_1, \ldots, P_T$.

The rotated sets of symbols 22, 24, ..., 26 are then input to a threader function 28 which performs a threading operation on the P sets of T phase rotated symbols 22, 24, ..., 26. The number of threads produced is equal to the number of linear transformations P, where 2<=P<=M. Each thread consists of an allocation of each one of the set of T phase rotated symbols to a respective one of the M transmit antennas during a particular symbol period within an overall codeword duration that is T symbol period in length according to the two properties defined below. The threaded sequences in turn define M transmit sequences, namely that which will be transmitted by each antenna.

A threaded sequence is an allocation of space-time resources (i.e. antennas over time) of P phase rotated vectors of length T. At each time, a thread uses only one antenna, and over time all the antennas are preferably used equally to the extent possible. If the number of antennas is not an even multiple of length T, then it will not be possible to use all the antennas equally in each thread. At the very least, each antenna is used at least once for each thread. Mathematically, a thread can be thought of as a placement of '1's in a permutation matrix.

The rate R of the system is ($P \times K$ transmitted symbols)/($T$ symbol periods)=number of symbols transmitted per transmit symbol period.

A first simple example of threading is shown in FIG. 1 where the output of the linear transformations is a 3×3 matrix generally indicated at 30 and the output of the threader is generally indicated at 32. In this example, it is assumed the input to each linear transformation is also 3 symbols so that P=M=K=T=3. In this example, the three phase rotated sequences $\{A_1, A_2, A_3\}$, $\{B_1, B_2, B_3\}$, $\{C_1, C_2, C_3\}$ are transformed into threaded sequences $\{A_1(Tx1), A_2(Tx2), A_3(Tx3)\}$ (this thread indicated at 34 in the Figure), $\{B_1(Tx2), B_2(Tx3), B_3(Tx1)\}$, and $\{C_1(Tx3), C_2(Tx1), C_3(Tx2)\}$. The code rate R for this code is 3×3/3=3. The threaded sequences define the transmit sequences that are transmitted by each antenna. In particular it can be seen that the transmit sequence $\{A_1, C_2, B_3\}$ is transmitted from the first antenna Tx1, the transmit sequence $\{B_1, A_2, C_3\}$ is transmitted from the second antenna Tx2, the transmit sequence $\{C_1, B_2, A_3\}$ is transmitted from the third antenna Tx3.

A second simple example of threading is shown in FIG. 1 where the output of the linear transformations is a 3×2 matrix generally indicated at 40 and the output of the threader is generally indicated at 42. In this example, the two phase rotated sequences $\{A_1, A_2, A_3\}$, $\{B_1, B_2, B_3\}$ are transformed into two threaded sequences $\{A_1(Tx1), A_2(Tx2), A_3(Tx3)\}$, $\{B_1(Tx2), B_2(Tx3), B_3(Tx1)\}$. In can be seen that $\{A_1, 0, B_3\}$ is transmitted from the first antenna Tx1, $\{B_1, A_2, 0\}$ is transmitted from the second antenna Tx2, and $\{0, B_2, A_3\}$ is transmitted from the third antenna Tx3. In this example, P=number of threads=2; T=number of symbols output by each linear transformation=3; K=number of symbols input to each linear transformation is some number <=3, assume it is 2; M=number of antennas=3. The code rate R for this code is 2×3/3=2. This can be seen from the form of the matrix 36 which shows two symbols being transmitted per symbol period.

The structure of FIG. 1 is preferably implemented in a modem that converts the output of the channel coder into M antenna signals. This can be implemented in hardware, software, firmware, or a suitable combination of these functions. It is also to be clearly understood that while a series of functional blocks are shown in FIG. 1 interconnected in a particular way, the same functionality may be deliverable in a large number of physical implementations, and moreover, any implementation which performs operations which are mathematically equivalent to those of FIG. 1 is also considered to fall within the scope of the invention.

Figure 3:
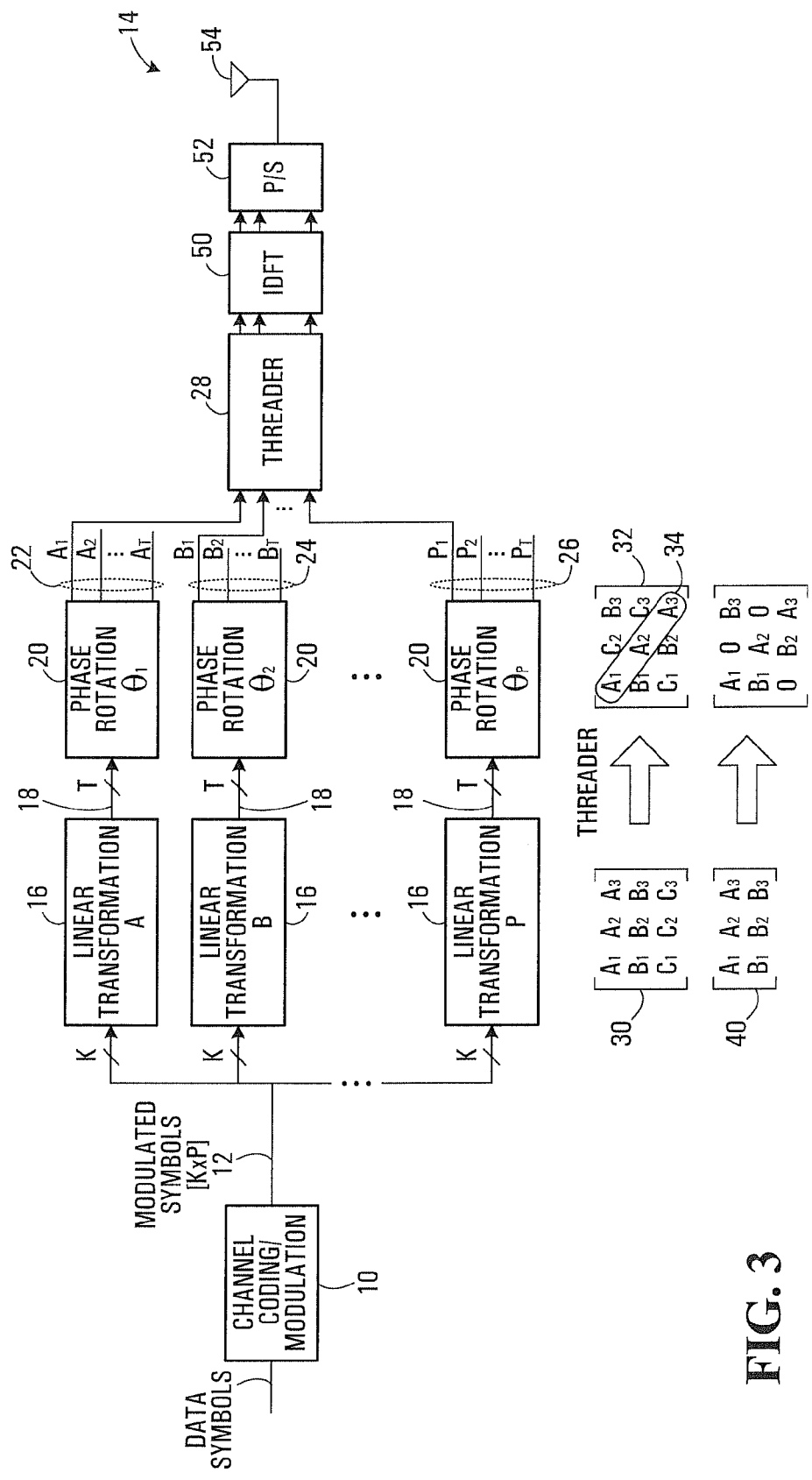
FIG. 3 is a block diagram of another space-time coding system provided by an embodiment of the invention.

An embodiment of the invention provides an M antenna transmitter adapted to implement one of the linear threaded algebraic space-time constellations described herein. The full diversity algebraic constellations in other embodiments are used in a single antenna transmitter, including but not restricted to, orthogonal frequency division multiplexing. An example of this is shown in FIG. 3 where the outputs of threader 28 are shown input to an IDFT (inverse discrete Fourier transform) 50. The output of the IDFT is passed through parallel to serial converter 52 and then to single output antenna 54.

In another embodiment, the threaded algebraic space time constellation described herein may be used in collaborative coding schemes for ad hoc wireless networks. A collaborative scheme might be advantageous in the context of mobile nodes that do not have sufficient antennas. A mobile node can use other mobile nodes in its neighbourhood as "virtual" antennas to relay its message to the destination. Assuming that each of these nodes is capable of receiving and decoding a source message, then it can encode it and send it over time. For example, with reference to the specific example of FIG. 1, a three different nodes could transmit $\{A_1, C_2, B_3\}$, $\{B_1, A_2, C_3\}$ and $\{C_1, B_2, A_3\}$ respectively.

First Example

Further details of this example can be found in M. O. Damen, H. El Gamal and N. C. Beaulieu, "Linear Threaded Space-Time Constellations," IEEE Transactions on Information Theory, vol. 49, pp. 2372-2388, October 2003, hereby incorporated by reference in its entirety.

I. Notation

The following notations are used throughout this example: The letter R denotes a ring, Z the ring of integers, Z[i] the ring of complex integers (or Gaussian integers with $i \triangleq \sqrt{-1}$), Z[j] the ring of Eisenstein integers (with $j \triangleq e^{2i\pi/3}$). The letter F denotes a field, Q the field of rational numbers, R the field of real numbers, and C the field of complex numbers. For n integer, $w_n \triangleq e^{2i\pi/n}$ denotes the n-th root of unity, and $Z[w_n]$ is the ring of algebraic integers in the n-th cyclotomic number field $Q(w_n)$. For m and n integers, (n|m) denotes their greatest common divisor (if m and n are co-prime, then (n|m)=1). The number of integers less than n and co-prime with it is given by the Euler Φ-function Φ(n). The letter S denotes a multidimensional constellation carved from $R^m$ where the ring R and the dimension m are determined from the context. Further, upper-case boldface letters denote matrices and lowercase boldface letters denote vectors, with the symbols I and 0 denoting, respectively, the identity matrix and the all-zero column vector of a size determined by the context. Finally, the superscripts $^T$, $^H$, and *, denote the transpose, hermitian, and conjugate operators, respectively.

The following definitions are useful for the development of our results.

Definition 1. A number ring $R \subset C$ is the ring of algebraic integers in a number field (i.e., a finite degree extension of the rational numbers field Q). The shortest non-zero element in R is denoted by $\Omega_R$, i.e., $\Omega_R \triangleq \inf\{|s|, s \neq 0 \in R\}$ (note that $\Omega_R$ is not necessarily attained by a nonzero element from R). Finally, we denote by F the field of fractions of R, i.e., $F \triangleq \{\alpha/\beta : \alpha, \beta \in R, \beta \neq 0\}$ (e.g., R=Z, F=Q). In the sequel we restrict our attention to multidimensional constellations over number rings $S \subset R^m$, where a special attention is devoted to cyclotomic number rings.

Definition 2. A unitary transformation $U \in C^{m \times m}$, with $UU^H=I$, is called fully diverse over the ring R if its product distance is nonzero over $UR^m \setminus \{0\}$. In particular, let $s \triangleq (s_1, \ldots s_m)^T \neq 0 \in R^m$, and $x \triangleq (x_1, \ldots, x_m)^T = Us$, then U is fully diverse if $$D_U(s) \triangleq \tau \prod_{k=1}^{m} |x_k| \neq 0, \quad \forall s \neq 0 \in R^m \tag{1}$$

where $\tau \triangleq m^{m/2}$ is a normalization factor introduced here only for the sake of simplification (as evident in the proof of Lemma 3). If U is fully diverse then all constellations carved from $UR^m$ have the full diversity property. We defined the minimum product distance of U over a multidimensional constellation $S \subset R^m$ as $$d_U(S) \triangleq \min_{s \in S \setminus (o)} D_U(s). \tag{2}$$

We call U optimal over S if for any unitary transformation V, we have $d_U(S) \geq d_V(S)$. We call U optimal over $R^m$ if $\exists S_0 \subset R^m$ such that for any unitary transformation V, we have $$d_u(S) \geq d_v(S), \forall S \subset R^m \text{ such that } S \supseteq S_0. \tag{3}$$

The optimality criterion adopted here is inspired by the minimum product distance of unconstrained multidimensional constellations carved from $R^m$ with $m \in Z^{+2}$.

II. The Construction

Two lemmas that characterize optimal unitary transformations over number rings and follows:

Lemma 3. Let U be a unitary transformation. When the elements of U, $u_{kl}, k,l=1, \ldots, m$, belong to a field K (or a ring R') that contains the number ring R, then U is optimal over $R^m$ if $D_U(S) \in R \setminus \{0\}, \forall s \neq 0 \in R^m$.

Proof. Let $s=(S_1, 0, \ldots, 0)^T$, then $$D_U(s) = \tau |s_1|^m \prod_{k=1}^{m} |u_{k1}|. \tag{4}$$

Since $UU^H=I$, we have $$\sum_{k=1}^{m} |u_{k1}|^2 = 1. \tag{5}$$

Applying the Cauchy inequality theorem, we obtain $$\left(\prod_{k=1}^{m}|u_{k1}|^2\right)^{\frac{1}{m}} \leq \frac{\sum_{k=1}^{m}|u_{k1}|^2}{m} = \frac{1}{m}. \quad (6)$$

Substituting the above inequality in (4), we conclude $$D_U = \tau|s_1|^m \prod_{k=1}^{m}|u_{k1}| \leq |s_1|^m. \quad (7)$$

It follows that $\exists S_0$ such that $\forall S \supseteq S_0$ $$d_U(S) \leq \min\{|s|^m \epsilon S_{2D}, s \neq 0\} \leq \min\{|s| \epsilon S_{2D}, s \neq 0\},$$

where $S_{2D}$ is the range (in R) spanned by the components of S and the last inequality follows since R contains 1. Therefore, as the constellation S grows, the best minimum product distance one can attain approaches $\Omega_R$ as S tends to $R^m$. Hence, U is optimal if $D_U(s) \epsilon R \setminus \{0\}, \forall s \neq 0 \epsilon R^m$.

We note here that full diversity is a necessary condition for optimality. This lemma specifies the notion of optimality of the transformation U, especially when one has a lower bound on the minimal absolute value of the elements of R (e.g., for R=Z,Z[i],Z[j], one has $\Omega_R$=1). In fact, when $\Omega_R$=1, the optimal unitary transformation will maximize the minimum product distance for all finite constellations carved from R. Since all known digital modulations are carved from the cyclotomic integer rings $Z[w_n]$, it is important to know the optimal values of the minimum product distances as a function of n. One can prove the following:

Lemma 4.

$$\Omega_{Z[w_n]}=1, n=1,2,3,4,6 \quad (8)$$

$$\Omega_{Z[w_n]}=0, n=5 \text{ or } n>6 \quad (9)$$

This result is directly related to the fact that the constellations carved from Z, Z[i], and Z[j] have a constant minimum squared Euclidean distance of 1 (within a normalization depending only on the energy of the constellation). In these cases, the optimal unitary transformations will achieve the optimal minimum product distance for any finite constellations.

The PSK constellations carved from $Z[w_n]$ (with n=5, or n>6), on the other hand, have a minimum Euclidean distance that goes to zero as n increases. The notion of full diversity still holds in these cases as well since $d_U(S)$ tends to zero when increasing the size of the constellation, but can be guaranteed to never attain this value for any finite constellation S. As shown in the following, our construction will guarantee a non-zero lower bound on the minimum product distance that depends on the size of the constellation.

We observe that, in practice, it may not be beneficial to construct multi-dimensional constellations using PSK inputs since, by doing so, one looses the constant modulus property of these constellations. Nonetheless, proposing good unitary transformations over $Z[w_n]$ is interesting for other constellations carved from this ring which have good minimal squared Euclidean distances that do not vanish in the limit. Such constellations can arise from rotating m-dimensional constellations over Z or Z[i] by unitary transformations.

Theorem: Let R be a number ring, $\phi_1, \ldots, \phi_m$ with $|\phi_k|$=1, ..., m, and $F_m$ be the m×m Discrete Fourier Transform (DFT) matrix with entries $$f_{kl} = \frac{1}{\sqrt{m}}e^{-2i\pi(l-1)(k-1)/m} = \frac{1}{\sqrt{m}}(w_m^{(k-1)(l-1)})^*, l, k = 1, \ldots, m.$$

Then, the unitary transformation $$U \triangleq F_m^H \text{diag}(\phi_1, \phi_2, \ldots, \phi_m) \quad (10a)$$

is fully diverse over R if $\phi_1=1, \phi_2=\phi^{1/m}, \ldots, \phi_m=\phi^{(m-1)/m}$, and $\phi$ is chosen such that $\{1, \phi, \ldots, \phi^{m-1}\}$ are algebraically independent over R. Such a choice of $\phi$ includes:
  1. $\phi$ transcendental: $\phi=e^{i\lambda}$, with $\lambda \neq 0 \epsilon R$ algebraic.
  2. $\phi$ algebraic of degree $\geq$ m over F, the field of fractions of R, such that $\{1, \phi, \ldots, \phi^{m-1}\}$ is a basis or part of a basis of $Q(\phi)$ over F (i.e., the degree of $\phi$ over F is m'$\geq$m such that $\{1, \phi, \ldots, \phi^{m'-1}\}$ is a basis of $Q(\phi)$ over F).

More strongly, when $R=Z[w_n]$, our construction yields optimal unitary transformations if and only if $$\phi=w_n, \text{ when } n \text{ is even}: n=2^{r_0} \times p_1^{r_1} \times \ldots \times p_f^{r_f} \quad (10b)$$

$$\phi=w_{2n}, \text{ when } n \text{ is odd}: n=p_1^{r_1} \times \ldots \times p_f^{r_f} \quad (10c)$$

$$m=2^{r_0} \times p_1^{r_1} \times \ldots \times p_f^{r_f} \quad (10d)$$

where $P_1, \ldots, P_f$ are primes different from 2, and f, $t_0, \ldots t_f$, $r_0 \ldots, r_f$ are positive integers. In particular, R=Z[i] implies that the optimal unitary transformations using our construction in (10) are only possible for $m=2^r$, $r \geq 0$ and R=Z[j] implies that they only exist for $m=2^{r_0}3^{r_1}$, $r_0 \geq 0$, $r_1 \geq 0$.

If one restricts $R=Z[w_n]$, then full diversity unitary transformations can still be found for m not satisfying (4) with good minimum product distances. Achieving the optimal minimum product distance using our construction is, however, not possible in these scenarios since $\phi$ should be chosen of a higher degree than the degree of $w_n$ in order to make $d_U(S) \neq 0$ for $S \subset Z[w_n]^m$. From the proof of the Theorem, one can see that this implies $d_U(s) \notin Z[w_n]$ for arbitrary $S \epsilon Z[W_n]^m$; indeed, its value expresses the simultaneous Diophantine approximation of $\{1, \phi, \ldots, \phi^{m-1}\}$ by numbers from $Z[w_n]$. Therefore, choosing $\phi$ such that $\{1, \phi, \ldots, \phi^{m-1}\}$ are badly approximated over $Z[w_n]$ enhances the minimum product distance. One possible choice of $\phi$ is an algebraic integer with the smallest degree that satisfies the Theorem. In this case, by choosing $\phi$ to be algebraic such that $\{1, \phi, \ldots, \phi^{m-1}\}$ is a basis or part of a basis of $Q(\phi)$ over $Z[w_n]$, one has the following lower bound on minimum product distance of a finite constellation $S \subset Z[w_n]^m$ $$d_U(S) \geq \frac{1}{(2+mv)^{m(d-1)}}, \quad (11)$$

where d is the minimal degree of the number field that contains $\phi$ and the entries of S (i.e., d is the maximum of the degrees of $\phi$ and $w_n$), and v is a quantity that depends only on the maximum absolute value of the components of the vectors in the finite constellation S. The proof is directly related to the simultaneous approximation of algebraic numbers by other algebraic numbers. In order to maximize this lower bound (5), one needs to choose $\phi$ algebraic with the smallest possible degree which satisfies the main theorem. For example, for m=5, and n=4, one needs to choose $\phi=w_q$ of degree $\Phi(q) \geq$ m.

One can readily verify that the smallest number satisfying this is $q=7$. Indeed, we have found that $\phi=w_7$ gives a local optimal value, with respect to the possible choices of $\phi$, for the minimum product distance when using a 4-QAM constellation carved from $Z[i]$. Although $d_U(S)$ may decrease when increasing the size of the constellation in this case, one can easily see from our result that this choice of $\phi$ gives a fully diverse transformation over all constellations carved from $Z[i]$. As a general rule to maximize the lower bound in (5) for $n=4$ (when m is not a power of 2), one should choose $\phi=w_q$ with q the first prime such that $q-1 \geq m$. This rule also applies for n and m not satisfying (4) where one chooses $\phi=w_q$ with q the smallest prime such that $\{1, \phi, \ldots, \phi^{m-1}\}$ are independent over $Z[w_n]$. This rule, however, does not always give the (global) optimal $\phi$ for a given finite constellation carved from $Z[w_n]$. In Table I we present the minimum product distances achieved by the proposed unitary transformation with a normalized 4-QAM input for different values of m. For $m=5, 6, 7$, $\phi$ chosen by the above rule is found to give local optima of the minimum product distances; however, this is not the case when choosing $\phi=w_5$ for $m=3$. In this special case, we have found $\phi=w_3$ and $\phi=w_{35}^3$ to give local optima of the minimum product distance over this constellation of 0.268 and 0.4854, respectively. As expected, for m satisfying (4), $\phi=w_4$ gives global optima. In Table II we report the minimum product distances of the proposed rotations with $m=2$ and n-PSK input constellations (with $n=4, 8, 16, 32, 64$). As predicted by the optimality criterion of Lemma 3, we found $\phi=w_n$ to yield global optima in all these cases. Also, note that the exponent in the lower bound in (5), $m(d-1)$, is minimized when $\phi$ and m satisfy the constraints (11)-(4), i.e., when the optimality criterion in Lemma 3 is satisfied.

Remarks:

1) The general construction in (10) allows for more degrees of freedom by simultaneously optimizing $\phi_1, \ldots, \phi_m$, especially for the dimensions m that are not powers of the primes dividing n This line of research is under investigation. The transcendental choice of $\phi$ can be of interest in some cases. For example, selecting $\phi$ randomly over the unit circle gives a fully diverse unitary transformation with probability 1. This is because the probability that $\phi$ will be algebraic is zero since the algebraic numbers are of measure zero in C.

TABLE I

The Minimum Product Distances When Using Construction (10a) Over Different Rotated m-Dimensional 4-QAM Constellation $\subset Z[i]$

| | m | | | | | |
|---|---|---|---|---|---|---|
| 2 | 3 | 4 | 5 | 6 | 7 | 8 |
| $d_U(s)$ | 1 | 0.0403 | 1 | 0.0543 | 0.0568 | 0.0024 | 1 |

TABLE II

The Minimum Product Distances When Using Construction (10a) Over Different Rotated 2-Dimensional n-PSK Constellations $\subset Z[w_n]$

| | n | | | |
|---|---|---|---|---|
| 4 | 8 | 16 | 32 | 64 |
| $d_U(s)$ | 1 | 0.2241 | 0.0297 | 0.0037 | 4.7255e-04 |

TABLE III

The Minimum Product Distances When Using Constellation (10a) Over Different Rotated m-Dimensional 8-QAM Constellations $\subset Z[i] \cup Z[j]$

| m | 2 | 3 | 4 |
|---|---|---|---|
| $d_U(s)$ | 0.2188 | 0.0287 | 0.0248 |

2) Instead of choosing $\phi_1, \ldots, \phi_m$ on the unit circle, one can allow them to be chosen from C, where U is normalized by the norm of the vector $(\phi_1, \ldots, \phi_m)$ to ensure constant average power. This can be useful for example if one wishes to use full diversity real constellations, or to allocate different powers to different symbols as in signal space coding for multi-user applications. For example, when $m=2$, the product distance is given by $$D_U(S) = |\phi_1^2 s_1^2 - \phi_2^2 s_2^2| \qquad (12)$$

with $S \in Z^2$. It is clear that choosing $\phi_1$ and $\phi_2$ such that $$\frac{\phi_1^2}{\phi_2^2}$$

is not a square in Q guarantees the full diversity property. As discussed in Lemma 3, if one can further guarantee that $D_U(s) \in Z^+$ for all $s \neq (0,0)^T$ then one optimizes the minimum product distance. Such choice includes $\phi_1=1$ and $\phi_2$ any quadratic residue ($\sqrt{2}, \sqrt{3}, \ldots$).

3) Some important digital modulations may belong to a union of cyclotomic number rings, e.g., the most energy efficient 8-QAM constellation given by $\{1+i, 1-i, -1+i, -1-i, \alpha, -\alpha, \alpha i, -\alpha i\} \subset Z0[i] Å Z0[j]$, with $\alpha=1+\sqrt{3}$. It is straightforward to apply our construction to this case using the rules above. For example, Table III lists the minimum product distances of the proposed rotated m-dimensional constellations with inputs from the above (normalized) 8-QAM constellation. Local optima are obtained for $\phi=w_4 w_6$, $w_5 w_6$, and $w_4 w_6$, respectively.

Method of Constellation Construction

Figure 2:
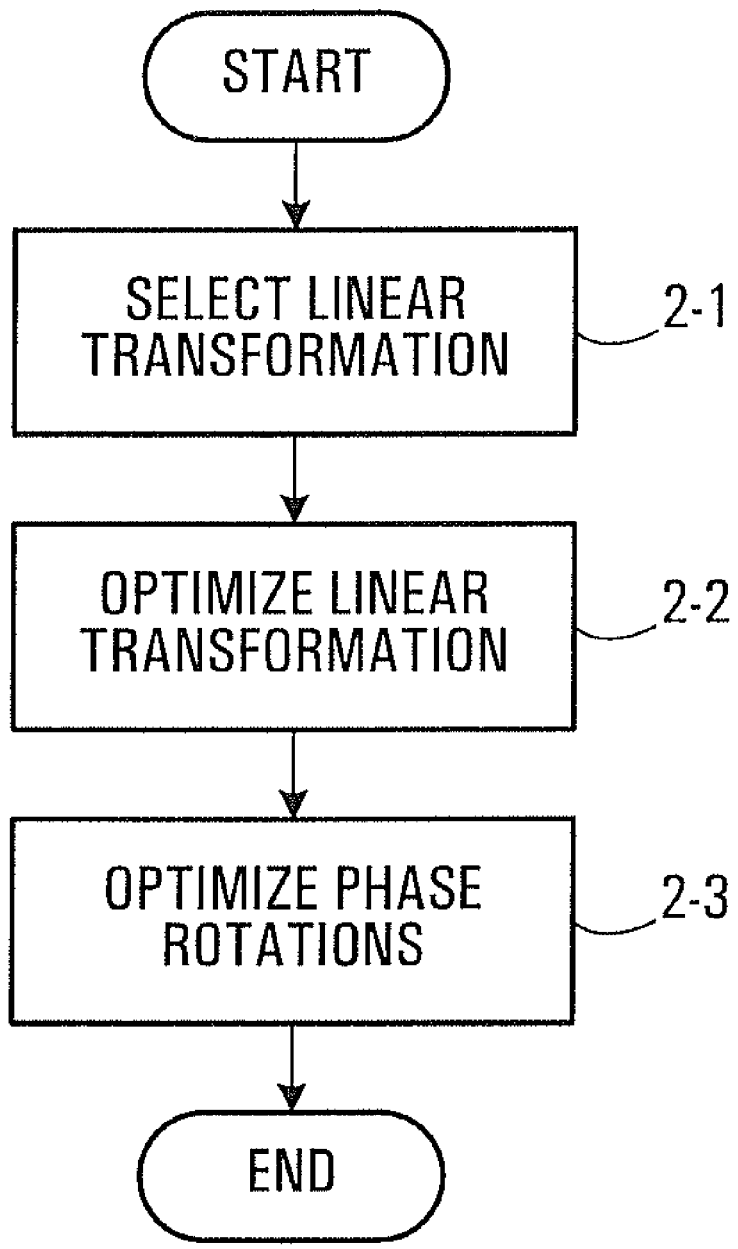
FIG. 2 is a flowchart of a method of constructing a constellation provided by an embodiment of the invention.

Another embodiment provides a method of constructing a full diversity algebraic constellation that might for example be used with the structure of FIG. 1. The method will now be described with reference to FIG. 2. The method starts with the selection at step 2-1 of a parameterized linear transformation. The linear transformation is parameterized in the sense that it defines a class of transformations as a function of at least one parameter over which optimization can be performed. Examples of suitable parameterized linear transformations include the previously introduced transformation of equation 10a. In other embodiments, other transformations are employed, but preferably a full diversity transformation is employed.

The next step 2-2 involves performing an optimization of the linear transformation. An optimization is achieved by determining the best parameter/parameters of the linear transformation as defined by an objective function. In a preferred embodiment, the objective function is one which maximizes coding gain of the linear transformation.

In the example of equation 10a, the parameters include $\phi_1, \phi_2, \ldots, \phi_M$ used in the diagonal matrix diag $(\phi_1, \phi_2, \ldots, \phi_M)$. Preferably, these are defined as a function of a single parameter $\phi$. Optimization is performed to determine the value of $\phi$ which results in the best coding gain for the linear transformation. Closed form results are available in certain circumstances, and these results are given in equation 10b, 10c and 10d for some codes. A true optimal result can only be determined for certain cases. Full diversity unitary transformations can still be found for m not satisfying 10d with good, but not necessarily optimal, minimum product distances. In this case, this optimization step is better referred to as a near-optimization step.

The next step 2-3 involves performing a further optimization to determine the phase rotations $\phi_i$, for i=0, ..., M−1. This is achieved by determining the best set of phase rotations as defined by an objective function. In a preferred embodiment, $\phi_i = \phi^{i-1}$ for some value $\phi$. In such embodiments, the further optimization need only determine the single optimal value for $\phi$. The following is an example of a solution for $\phi$.

In a preferred embodiment, in which it is assumed that K=M, codes are completely specified by the parameters M (the number of transmit antennas), N (the number of receive antennas), T (the number of symbol periods, i.e. the code consists of M×T signalling matrices), P (the number of threads giving the rate of the code in symbols from the input alphabet per channel use; we set P=min (M,N) in order to achieve full rate), θ (the Diophantine number within each thread in the M×T space-time matrix) and $\phi$ (the Diophantine number between the threads). The methods described above allow for a systematic design of space-time codes that achieve full diversity for arbitrary M, T, P and input alphabets. Given below in Table 1 is a set of examples of the new codes for some values of the above parameters with QAM constellations as input alphabets. Note that the values of θ and $\phi$ have been optimized for enhanced coding gain.

TABLE 1

| M | N | T | P | θ | $\phi$ |
|---|---|---|---|---|---|
| 2 | 1 | 2 | 1 | exp(iπ/4) | 1 |
| 3 | 1 | 3 | 1 | exp(2π/5) | 1 |
| 4 | 1 | 4 | 1 | exp(iπ/8) | 1 |
| 2 | 2 | 2 | 2 | exp(iπ/4) | exp(iπ/6) |
| 4 | 2 | 4 | 2 | exp(iπ/8) | exp(iπ/6) |
| 3 | 3 | 3 | 3 | exp(2π/5) | exp(2π/7) |
| 4 | 4 | 4 | 4 | exp(iπ/8) | exp(iπ/32) |
| 6 | 6 | 6 | 6 | exp(2π/7) | exp(2π/42) |
| 8 | 4 | 8 | 4 | exp(iπ/16) | exp(iπ/64) |
| 10 | 5 | 10 | 5 | exp(2π/11) | exp(2π/55) |
| 12 | 12 | 12 | 12 | exp(2π/13) | exp(2π/156) |

Specific examples of codes provided by embodiments of the invention are defined in equation 27 of the second example below for a MISO channel, and equations 32, 33, 34, 35, 36 of the second example for MIMO channels.

Two specific performance examples are shown in Table 2 and Table 3 below. In both of these examples, the row "new code" contains the BER performance of the new code defined in equation 34 of the second example. The row "TI code" contains the BER performance for space-time block coded transmit antenna diversity for W-CDMA, defined in SMG2 document 581/98, submitted October 1998. The row "Lucent code" contains the BER performance results for the BLAST code developed by Lucent.

The results in Table 2 are for a rate of 6 bits/Hz, with two receiver antennas. The results in Table 3 are for a rate of 8 bits/Hz. It can be seen that for both examples, and at various SNRS, the bit error rate of the new code is superior to the two other codes, in some cases significantly so.

TABLE 2

| Rate 6 bits/s/Hz (Two receiver antennas) | | | | |
|---|---|---|---|---|
| SNR | 10 dB | 15 dB | 20 dB | 25 dB |
| New Code | 1.074943e−01 | 2.702250e−02 | 2.915833e−03 | 1.671667e−04 |
| TI Code | 1.177350e−01 | 3.278803e−02 | 4.496805e−03 | 1.783414e−04 |
| Lucent Code | 1.080808e−01 | 2.798733e−02 | 3.602167e−03 | 2.930000e−04 |

TABLE 3

| Rate 8 bits/s/Hz (Two receiver antennas) | | | | |
|---|---|---|---|---|
| SNR | 20 dB | 25 dB | 30 dB | 35 dB |
| New Code | 1.214286e−02 | 1.042427e−03 | 5.352218e−05 | 1.044500e−06 |
| TI Code | 3.771820e−02 | 5.649718e−03 | 3.073882e−04 | 3.338362e−05 |
| Lucent Code | 1.227310e−02 | 1.267596e−03 | 1.338178e−04 | 6.216917e−06 |

The space-time coder alone may be of value in a collaborative scheme in an ad hoc wireless network. The invention is not limited to wireless applications but may find application in data storage and retrieval systems for audio, video data, and more.

Second Example

Further details of this example can be found in M. O. Damen, H. El Gamal and N. C. Beaulieu, "Systematic Construction of Full Diversity Algebraic Constellations," IEEE Transactions on Information Theory, vol. 49, pp. 3344-3349, December 2003, hereby incorporated by reference in its entirety. For this example, equation numbering is restarted at (1).

I. System Model

We consider signaling over an M×N multi-input multi-output (MIMO) channel. A K×1 information symbol vector $u=(u_1, \ldots, u_K)^T \in U^K$, where U denotes the input constellation, is mapped by a constellation encoder γ into an MT×1 output vector γ(u), with components from the alphabet $$\prod_{i=1}^{MT} S_i$$

(i.e., $$\gamma: U^K \to \prod_{i=1}^{MT} S_i).$$

In general, we allow the transmitted single dimensional constellation $S_i$ to vary across time and space. All the proposed constellations, however, will enjoy the symmetry property that $|S_i|=|S_j|$. In this work, we also assume that the information symbol vector is a random variable with a uniform distribution over $U^K$. A space-time formatter, "F", then maps each encoded symbol vector $\gamma(u)$ into an M×T space-time constellation $C_u=F(\gamma(u))$, where M symbols $C_{mt}$ (m=1, ..., M) are transmitted simultaneously from the M transmit antennas at time t, t=1, ..., T. When there is no confusion, we denote the space-time constellation by C. The transmission rate of the constellation C is therefore equal to K/T symbols per channel use (PCU). The throughput of the system, in bits PCU, is therefore given by $K/T \log_2|U|$.

The N×T received signal matrix X, after matched filtering and sampling at the symbol rate, can be written as $$X=\sqrt{\rho}HC_u+W, \quad (1)$$

where $H=[h_{nm}]$ is the N×M channel matrix, and $h_{nm}$ denotes the fading coefficient between the $m^{th}$ transmit and the $n^{th}$ receive antenna. These fading coefficients are assumed to be independent, identically distributed (i.i.d.) zero-mean complex Gaussian random variables with unit variance per complex dimension. In the quasi-static, frequency non-selective fading model adopted in this paper, the fading coefficients are assumed to be fixed during one codeword (i.e., T time periods) and change independently from one codeword to the next. The entries of the N×T noise matrix W, i.e., $w_{nt}$, are assumed to be independent samples of a zero-mean complex Gaussian random process with unit variance per complex dimension. We further impose the average power constraint that $$\sum_{m=1}^{M}\sum_{t=1}^{T}E_u|c_{mt}|^2 = T \quad (2)$$

where $E_u$ refers to expectation with respect to the random data vector u. The received SNR at every antenna is therefore independent of the number of transmit antennas and is equal to $\rho$. Moreover, we assume that the channel state information (CSI) is available a-priori only at the receiver. Unless otherwise stated, we focus our attention on constellations $U \subset \xi Z[w_M]$, where $\xi$ is a normalization constant and $$Z[w_n] \triangleq \left\{ \sum_{k=0}^{\phi(M)-1} a_k w_M^k, a_k \in Z, k=0, \ldots, \phi(M)-1 \right\} \quad (3)$$

is the ring of integers of the M-th cyclotomic number field, $Q(w_M)$, with Z the ring of integer numbers, $w_M=e^{2i\pi/M}$ the M-th primitive root of unity, and $\phi(M)$ denoting the Euler $\phi$-function that measures the number of integers less than M and co-prime with it. Without loss of generalization, we will assume that $\xi$ is adjusted to normalize the average power of U to one (i.e., $E[|u|^2]=1$). With a slight abuse of notation, we will rely on the isomorphism between $\xi Z[w_M]$ and $Z[w_M]$ and refer to both rings as $Z[w_M]$ when there is no confusion. We also denote the minimum squared Euclidean distance of U as $d_U^2$. Finally, we note that this set of constellations contains all the pulse amplitude modulation (PAM) constellations (i.e., M=1, 2), square quadrature amplitude modulation (QAM) constellations (i.e., M=4), constellations carved from the hexagonal lattice (i.e., M=3), and phase shift keying (PSK) constellations (i.e., M≧5).

By stacking all the columns of matrix X in one column, i.e., $x\Delta vec(X)$, the received signal in (1) can be written in a vector form as $$x=\sqrt{\rho}H c_u+w, \quad (4)$$

where $H\Delta I_T \otimes H \in C^{TN \times TM}$, $\otimes$ denotes the Kronecker matrix product, $\bar{c}_u \Delta vec(C)$, and $w\Delta vec(W)$, with C the field of complex numbers. If the alphabet U belongs to a number ring R (e.g., U=4-QAM $\subset R=Z[i]$), then one calls the constellation C linear over R if $C_{u'}+C_{u''}=C_{u'+u''}$, for $u',u'' \in U^K$. In this case there exists a generator matrix $M \in C^{TM \times K}$ such that $c_u=Mu$. Then, (4) is a linear system with N×T equations and K unknowns with the combining matrix HM. The maximum likelihood (ML) solution in this scenario can be implemented using a sphere decoder whose average complexity is only polynomial in K for K≧N×T and medium to large SNR's. For K>N×T, one can use the generalized sphere decoder whose complexity is exponential in K-N×T and polynomial in N×T.

The main reason for restricting the discussion in this paper to linear constellations is to benefit from the linear complexity space-time encoder and the polynomial complexity ML decoding allowed by the linearity property when K≦N×T. The linearity of the constellation, however, implies some fundamental performance limits as detailed in the following two sections.

II. Design Criteria and Fundamental Limits

One of the fundamental challenges in the design of space-time signals is the fact that the optimal design criteria depend largely on the system parameters (e.g., number of receive antennas) and quality of service constraints (e.g., maximum allowable delay). One of the advantages of the proposed TAST constellations is that they nearly optimize these different criteria simultaneously.

1) Diversity Order and Coding Gain: Under the quasi-static assumption, the Chernoff upper bound on the pairwise error probability of the ML detection of u" given that u'≠u" was transmitted is given by $$Pr\{u' \to u''\} \le \left(det\left(I_M + \frac{\rho}{4}A(u',u'')\right)\right)^{-N} = \left(\prod_{l=1}^{r(A(u',u''))} \left(1+\frac{\rho}{4}\lambda_l(u',u'')\right)\right)^{-N} \quad (5)$$

where $I_M$ is the M×M identity matrix $$A(u',u'')\Delta(C_{u'}-C_{u''})(C_{u'}-C_{u''})^H$$

the superscript $^H$ denotes the conjugate transpose operator, $r(A(u',u''))$ is the rank of $A(u',u'')$, and $\lambda_1(u',u''), \ldots, \lambda_{r(A(u',u''))}(u',u'')$ are the non-zero eigenvalues of $A(u',u'')$. One can easily see that the largest power of the inverse of the SNR (i.e., diversity order) in (5) is equal to N×r(A(u',u")), and the dominant term in (5) at large SNR is $$\prod_{l=1}^{r(A(u',u''))} \lambda_l(u', u'').$$

This observation gives rise to the well known determinant and rank criteria. Therefore, a full diversity space-time constellation C achieves the maximum diversity order of MN. In addition, one refers to the term $$\delta_C \triangleq \min_{u' \ne u'' \in U^K} \left( \prod_{l=1}^{M} \lambda_l(u', u'') \right)^{1/M} \quad (6)$$

as the coding gain of the full diversity constellation C.

Using the linearity of the constellation, the average power constraint, and the geometric mean/arithmetic mean inequality, one can see that the maximum achievable coding gain for a linear space-time constellation that supports L symbols PCU from an input constellation U is given by $$\delta_C \le \frac{d_U^2}{ML}. \quad (7)$$

2) *Squared Euclidean Distance:* For small SNR and/or large numbers of receive antennas, one can see that the dominant term in (5) is the squared Euclidean distance of space-time constellation C given by $$d_C^2 \triangleq \min_{u', u'' \in U^K} \sum_{l=1}^{M} \lambda_l(u', u''). \quad (8)$$

Again, using the linearity and average power constraints, one can show that $$d_C^2 \le \frac{d_U^2}{L}, \quad (9)$$

for a linear space time constellation that supports L symbols PCU.

One can use (7) and (9) to extract a useful design guideline. The non-linear shrinking of $d_U^2$ with the size of the constellation implies that the upper bounds in (7) and (9) are maximized by maximizing the number of symbols PCU for a fixed throughput. The only exception for this rule is when one moves from a BPSK to a QPSK constellation where the two choices are equivalent. This exception can be attributed to the wasteful nature of the BPSK constellation. The maximum value of L is, however, limited to min(N,M) to facilitate polynomial complexity ML decoding. This argument implies that the choice L=min(N,M) strikes a very favorable tradeoff between performance and complexity. Therefore, all the proposed constellations will be constructed to achieve min(N,M) symbols PCU. Moreover, we will show that the proposed constellations achieve the upper bound on the squared Euclidean distance with equality in all cases.

3) *Peak-to-Average Power Ratio (PAR):* The PAR of the space-time constellation plays an important role in peak power limited systems because a high value of the PAR will shift the operating point to the nonlinear region of the power amplifier which may cause power clipping and/or distortion. Therefore, it is desirable to construct space-time constellations with low PAR values. We define the baseband PAR for a given constellation U as $$PAR_U \triangleq \frac{\max|u|^2}{E[|u|^2]}, u \in U. \quad (10)$$

For example, the PAR for a square M-QAM constellation equals $$3\frac{\sqrt{M}-1}{\sqrt{M}+1}.$$

The PAR of the space-time constellation C is given by $$PAR_C \triangleq \frac{\max|c_{mt}|^2}{E[|c_{mt}|^2]}, \quad c_{mt} \in S_i, i = 1, \ldots, MT \quad (11)$$

where $S_i$ is the single dimension alphabet at the output of the encoder. For symmetric ST constellations, with the same average power transmitted from all the antennas and the same PAR for all the $S_i$, the average power constraint can be used to simplify (11) to $$PAR_C \triangleq M \max |C_{11}|^2, C_{11} \in S_1 \quad (12)$$

The linearity of the space-time encoder and the independence of the inputs imply the following lower bound on the PAR of the constellation $$PAR_C \ge PAR_U \quad (13)$$

where U is the input constellation. Guided by the single antenna scenario, one can see that there is a fundamental tradeoff between optimizing the performance of the constellation in average power limited systems and minimizing the PAR. For example, it is well-known that QAM constellations outperform PSK constellations in terms of average power performance while PSK constellations enjoy the optimum PAR. To quantify and utilize this tradeoff, we define the normalized coding gain and squared Euclidean distance, respectively, as $$\eta_C \triangleq \frac{\delta_C}{PAR_C} \quad (14)$$

$$\chi_C^2 \triangleq \frac{d_C^2}{PAR_C} \quad (15)$$

These metrics play the same role as the coding gain and squared Euclidean distance, defined earlier, in the case of peak power limited systems. They will be used in the sequel to guide the design and measure the optimality of the proposed space-time constellations. Combining (7), (9), (10), and (13), we obtain the following upper bounds on the normalized coding gain and squared Euclidean distance $$\eta_C \leq \frac{d_U^2}{M \times L \times PAR_U}, \quad (16)$$

$$\chi_C^2 \leq \frac{d_U^2}{L \times PAR_U}. \quad (17)$$

We will show later that these bounds are achievable for constellations that support one symbol PCU.

4) Delay: One can easily see that a non-zero coding gain, and hence, full diversity, can only be achieved if $T \geq M$ (i.e., so that A can have full row rank). Therefore, the space-time constellation C will be called delay optimal if $T=M$. All the constellations considered in this paper are delay optimal by construction, and hence, we will always assume that $T=M$ unless otherwise stated. The optimality of the delay is also desirable from a complexity point of view since it minimizes the dimension of the sphere decoder.

5) Mutual Information: Assuming that the ST constellation will be concatenated with a Gaussian outer codebook, Hassibi and Hochwald proposed the average mutual information between the input of the space-time constellation and the received signal as the design metric. They further presented a numerical optimization technique for constructing constellations with near optimal average mutual information. It is straightforward to see that the optimal constellation is the one that preserves the capacity of the channel, and hence, we will refer to it as an information lossless constellation. The prime example of an information lossless constellation is the identity parser which distributes the output symbols of the outer code across the M transmit antennas periodically. However, optimizing the mutual information only may not be sufficient to guarantee good performance. Furthermore, imposing the constraint that $L \leq \min(N, M)$ generally entails a loss in the mutual information when $N < M$ (the only known exception for this observation is the Alamouti scheme with one receive antenna). In the sequel, we will show that the average mutual information achieved by the full diversity constellations proposed here is optimal (i.e., information lossless) when $N \geq M$ and very close to being optimal when $N < M$.

III. The Diversity vs. Rate Tradeoff

In multi-antenna systems, one can increase the transmission rate at the expense of a certain loss in the diversity advantage. Earlier attempts to characterize this tradeoff have defined the transmission rate as the number of transmitted symbols PCU. The TAST constellations presented here offer a constructive proof that one can simultaneously achieve full diversity while transmitting at the full rate of $\min(M,N)$ symbols PCU. The tradeoff between rate and diversity becomes only necessary if one imposes further requirements on the system. Three scenarios are considered in the following subsections. First in section A below we allow the transmission rate to increase with the SNR. Then, we characterize the diversity-vs-rate tradeoff under peak power and complexity constraints in sections B and C respectively.

A. Rate Scaling with the Signal-to-Noise Ratio

The transmission rate, in bits PCU, is allowed to grow with the SNR as $$R = r \log_2 \rho \quad (18)$$

where r is defined as the multiplexing gain. The authors further characterize the optimal tradeoff between the achievable diversity gain d, $0 \leq d \leq MN$, and the achievable multiplexing gain r, $0 \leq r \leq \min(M,N)$, for an M×N MIMO system as $$d = (M-r)(N-r) \quad (19)$$

This characterization has an elegant interpretation for MIMO systems with fixed transmission rates.

Proposition 1. Let C(R) be a ST signaling scheme that supports an arbitrary rate R in bits PCU. Then, C achieves the optimal diversity-vs-multiplexing tradeoff if $$P_e(C(R), \rho) = \alpha P_{out}(R, \rho), \forall R, \rho \quad (20)$$

where $\rho$ is the SNR, $P_{out}(R,\rho)$ is the outage probability at R and $\rho$, $P_e(C(R),\rho)$ is the probability of error at this particular rate and SNR, and $\alpha$ is an arbitrary constant.

Proposition 1 means that the gap between the performance of the optimal transmission scheme and the outage probability should be independent of the transmission rate and the SNR. Proposition 1 also highlights the fact that this tradeoff characterization does not capture the coding gain of the constellation (i.e., the optimal tradeoff curve is achieved for any constant $\alpha$). One can therefore augment this tradeoff characterization by requiring that $\alpha=1$ for the optimal scheme.

In the sequel, we will argue that the proposed constellations achieve the optimal tradeoff between the diversity and rate, for $N=1$ and $N \geq M$, when concatenated with an outer Gaussian codebook under the ML decoding assumption. We will further present simulation results which indicate that the proposed constellations achieve the optimal tradeoff curve even when the inputs are drawn from uncoded QAM constellations, where the constellation size increases with the SNR.

B. Tradeoff Under Peak Power Constraints

In order to simultaneously achieve full diversity and full transmission rate in an unconstrained system, the TAST constellations induce an expansion of the output constellations $S_i$. In fact, this constellation expansion is a characteristic of most space-time signals that are linear over the field of complex numbers. The constellation expansion, however, results in an increase in the peak transmitted power. In order to avoid the increase of the peak power, one can limit the output constellations (i.e., $S_i$) to be standard, but possibly different, QAM or PSK constellations. This constraint, however, imposes the following fundamental limit on the tradeoff between transmission rate and diversity advantage. This bound is obtained from the Singleton bound and assumes a symmetric ST constellation with $|S_i|=|S_j|$ $$R \leq \log_2 |S_i| \left( M - \frac{d}{N} + 1 \right). \quad (21)$$

For example, to achieve full diversity (i.e., $d=MN$), the maximum transmission rate is one symbol, drawn from $S_i$, PCU which corresponds to $\log_2 |S_i|$ bits PCU irrespective of the number of receive antennas.

By combining L symbols from U to obtain a symbol from $S_i$, a linear ST constellation can achieve full diversity only if $$|S_i| \geq |U|^L \forall i \quad (22)$$

as predicted by the Singleton bound (21). All the constellations proposed here satisfy the lower bound in (22) with equality. Now, by imposing the constraint that $|S_i|=|U|$ (i.e., no increase in the PAR), equality in the Singleton bound (21) can be satisfied with linear ST constellations only in the full diversity scenario (i.e., $d=MN$). In general, the sub-optimality of linear ST constellations in peak power limited ST systems is formalized in the following result.

Proposition 2. The diversity advantage of a linear ST constellation that supports L symbols PCU using output constellations $S_i$ that satisfy the constraint that $|U|=|S_i|$, is governed by $$d \leq \left\lfloor \frac{M}{L} \right\rfloor N. \quad (23)$$

Variants of the proposed constellations are provided below that realize this optimal tradeoff. Interestingly, Proposition 2 argues that the V-BLAST architecture achieves the optimal diversity advantage for full rate symmetric systems (i.e., L=M=N) with strict peak power constraints (i.e., $|S_i|=|U|$).

C. Tradeoff Under Complexity Constraints

Although ML decoding for the full rate and full diversity linear constellations only requires polynomial complexity in M min(M,N), this complexity can be prohibitive for systems with large numbers of transmit and receive antennas. This motivates the following question: what are the achievable diversity-rate pairs (d,L) for a MIMO system under the constraint that the dimension of the sphere decoder is $L_c$? The answer to this question is given in the following proposition.

Proposition 3. In an M×N MIMO system with $1 \leq L_c \leq M$ min(M,N) complex dimensions in the polynomial complexity sphere decoder and a diversity advantage $1 \leq d \leq MN$, the number of transmitted symbols PCU satisfies $$L \leq \min\left(\frac{L_c N}{d}, M, N\right) \quad (24)$$

where we require d/N to be an integer.

Proposition 3 means that, with complexity constraints, the choice of number of symbols PCU implies a tradeoff between the diversity advantage and the squared Euclidean distance (since a large number of symbols results in a large squared Euclidean distance as evident in (9)). One can use this observation, along with the fact that the squared Euclidean distance is the dominant factor for small SNR and/or large number of antennas, to conclude that the optimal choice of the number of symbols PCU depends on the available complexity, number of antennas, and SNR.

Similarly, one can investigate the complexity constrained tradeoff for other receiver architectures. For example, we have the following conjecture for the nulling and cancellation receiver where the diversity advantage is upper bounded by the number of excess degrees of freedom in the system of linear equations.

Conjecture 1. In an M×N MIMO system with $1 \leq L_c \leq M$ min(M,N) complex dimensions in the polynomial complex-ity nulling and cancellation algorithm supported by the receiver, one has $$\frac{1}{M} \leq L \leq \min(M, N, L_c) \quad (25)$$

$$d \leq \min\left(M, \frac{L_c}{L}\right)(N - L) + 1. \quad (26)$$

D. Constellations for MISO Channels

The designs proposed belong to the threaded algebraic space-time (TAST) signaling framework. The main idea behind this framework is to assign an algebraic code in each thread that will achieve full diversity in the absence of the other threads. One should then project the threads into different algebraic subspaces by multiplying each one with a properly chosen scaling factor to ensure that the threads are transparent to each other. Here, we utilize this framework to construct constellations with optimal (or near optimal) PAR's, minimum squared Euclidean distances, and coding gains. First, we impose the constraint that the number of threads is equal to the number of transmit antennas M, rather than the number of symbols PCU; this avoids sending zeros from some of the transmit antennas when L<M. Second, we replace the rate one algebraic rotations used as component codes in the different threads with simple repetition codes of length M. The resulting constellation, therefore, still supports one symbol PCU while avoiding the increase of PAR incurred by the rotation and the periods of no transmission.

TABLE A

Coding Gains For M-PSK Constellations With $\phi = e^{2i\pi/M}$ For M Even And $\phi = e^{2i\pi/2M}$ For M Odd

| | M | | | | | | | | | | | | | | |
|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 |
| $\delta_c$ (dB) | 3 | 1.8 | 0 | −3.7 | −3 | −7.8 | −6.5 | −10.9 | −9.3 | −13.5 | −11.6 | −15.6 | −13.6 | −17.4 | −15.3 |

Mathematically, over M transmit antennas and M symbol periods one sends M information symbols, $u_1, \ldots, u_M$ in a circulant M×M matrix as follows $$D_{M,M,1}(u) = \frac{1}{\sqrt{M}} \begin{pmatrix} u_1 & \ldots & \phi^{\frac{1}{M}} u_2 \\ \phi^{\frac{1}{M}} u_2 & \ldots & \phi^{\frac{2}{M}} u_3 \\ \vdots & \ddots & \vdots \\ \phi^{\frac{M-1}{M}} u_M & \ldots & u_1 \end{pmatrix} \quad (27)$$

where $D_{M,M,1}$ refers to the new TAST constellation with M transmit antennas, M threads, and one symbol PCU. The Diophantine number $\phi$ is chosen to guarantee full diversity and optimize the coding gain as formalized in the following two theorems.

Theorem 1. If the Diophantine number $\phi$, with $|\phi|=1$, is chosen such that $\{1, \phi, \ldots, \phi^{M-1}\}$ are algebraically independent over $Q(w_M)$, the M-cyclotomic number fields, then $D_{M,M,1}(u)$ in (27) achieves full diversity over all constellations carved from $Z[w_M]$. This can be achieved if $\phi$ is chosen such that:

3. $\phi = e^{i\lambda}$ with $\lambda \neq 0 \in R$ algebraic ($\phi$ transcendental).

4. $\phi$ algebraic such that $Q(\phi)$ is an extension of degree $\geq M$ over $Q(w_M)$ with $\{1, \phi, \ldots, \phi^{M-1}\}$ a basis, or part of a basis of $Q(\phi)$ over $Q(w_M)$.

Furthermore, $D_{M,M,1}(U)$ achieves the optimal Euclidean distance of $d_U^2$ and the optimal normalized Euclidean distance of $$\frac{d_U^2}{PAR_U}$$

(the constraint $|\phi|=1$ is imposed to ensure this property) Theorem 2. For $M=2^r, r \geq 1$, the optimal coding gain, i.e., $$\delta_C = \frac{d_U^2}{M},$$

can be obtained with $D_{M,M,1}$ by choosing the Diophantine number $\phi=i$ and constellations carved from $Z[i]$, and for $M=2^{r_0}3^{r_1}$, $r_0, r_1 \geq 0$ by choosing $\phi=e^{2i\pi/6}$ and constellations carved from $Z[j]$.

When $M \neq 2^r$, or $M \neq 2^{r_0}3^{r_1}$, $r_0, r_1 \geq 0$, one can only guarantee local optima for the coding gains by using exhaustive computer search or by choosing the Diophantine number as an algebraic integer with the smallest degree that guarantees full diversity (as in Theorem 1). It is also interesting to note that the optimal choice of Diophantine numbers in Theorem 2 does not depend on the size of the constellation, and hence, the proposed ST constellations are universal for any constellation size in these cases.

Theorems 1 and 2 allow for constructing constant modulus full diversity ST constellations with polynomial complexity ML decoding for any number of transmit antennae, M. This can be achieved by using M-PSK input modulations, i.e., $U \square \{e^{2i\pi k/M}, k=0, \ldots, M-1\} \subset Z[w_m]$ and choosing the Diophantine number $\phi$ to be a root of unity which satisfies the constraint that $\{1, \phi, \ldots, \phi^{M-1}\}$ are algebraically independent over $Z[w_M]$. For a given PSK constellation, one can use algebraic methods combined with computer search, to find $\phi$ that maximizes the coding gain of the system considered. For example, for $M=2$ with the M-PSK constellation, one has the following relation for the coding gain $$\delta_{D_{2,2,1}}(\phi) \triangleq \frac{1}{M} \min_{(u_1,u_2) \neq (0,0) \in Z[w_M]^2, |u_k| \leq 2, k=1,2} |u_1^2 - \phi u_2^2| \quad (28)$$

where the condition $|u_k| \leq 2$, $k=1, 2$, ensures that $u_k$ is a difference of two points in the M-PSK constellation. Thus, it suffices to choose $\phi$ not to be a quadratic residue in $Z[w_M]$ (i.e., $\phi^{1/2} \notin Z[w_M]$) in order to guarantee a nonzero determinant. For even values of M, the only roots of unity in $Q(w_M)$ are the M-th roots of unity, and hence, one can choose $\phi=e^{2i\pi/M}$ in these cases. For odd values of M, the only roots of unity in $Q(w_M)$ are the 2M-th roots of unity, and hence, it suffices to one choose $\phi=e^{2i\pi/2M}$ to guarantee that $\phi$ is not a quadratic residue in $Z[w_M]$ in these cases. This way, we can also guarantee that the determinant value in (31) is a nonzero integer from $Z[w_M]$. Furthermore, it can be shown these values of $\phi$ maximize the coding gain for constant modulus transmission with two transmit antennas (Table 1 reports the optimized coding gains for $M=2, \ldots, 16$). For an arbitrary number of transmit antennas and arbitrary M-PSK constellations, one can construct full diversity TAST constellations with optimal PAR's and optimized coding gains by setting the Diophantine number $\phi$ according to the rules in D. A. Marcus, Number fields. New York: Springer-Verlag, 1970. Moreover, Theorem 1 is general for constellations over any number ring R. In this case, the Diophantine number $\phi$ has to be chosen such that $\{1, \phi, \ldots, \phi^{M-1}\}$ are algebraically independent over the number ring considered. Such a generalization can be useful for including some constellations of particular interest. For example, the most energy efficient 8-QAM constellation is given by $$\{1+i, -1+i, 1-i, -1-i, 1+\sqrt{3}, -(1+\sqrt{3}), \quad (1+\sqrt{3})i, -$$
$$(1+\sqrt{3})i\} \subset Z[i] \cup Z[j].$$

Thus, choosing $\phi$ such that $\{1, \phi, \ldots, \phi^{M-1}\}$ are independent over $Z[i] \cup Z[j]$ gives full diversity TAST constellations over the 8-QAM constellation.

One can also use the new constellations to gain further insight into the tradeoff between performance and complexity for the orthogonal designs. Recently, a framework for the construction of delay-optimal orthogonal ST signals was presented. It is easy to see that these signals can be obtained from the construction in (27) if we allow for a slightly more general version of repetition coding where conjugation and/or multiplication by a constant is allowed for any number of entries. For example, for $M=4$, the delay optimal orthogonal constellation is given by $$O_4 \triangleq \begin{pmatrix} u_1 & u_2 & u_3 & 0 \\ -u_2^* & u_1^* & 0 & -u_3 \\ -u_3^* & 0 & u_1^* & u_2 \\ 0 & u_3^* & -u_2^* & u_1 \end{pmatrix} \quad (29)$$

where $u_1, u_2, u_3$ belong to the constellation considered. One can simply identify the threaded structure in (32) where a full diversity generalized repetition code is assigned to each thread. In order to ensure orthogonality, however, the fourth thread is left empty. The empty thread results in a reduced transmission rate and increased PAR. For a fixed throughput, the reduced rate of the orthogonal constellation translates into a loss in the coding gain. For example, at a rate of 3 bits PCU, the constellation $O_4$ uses a 16-QAM constellation whereas the constellation $D_{4,4,1}$ uses an 8-QAM constellation. This results in a coding gain of 2.2185 dB in favor of the $D_{4,4,1}$ code. In addition, the constellation $O_4$ has a PAR of 12/5, whereas the constellation $D_{4,4,1}$ has a PAR of 5/3 (a gain of 1.5836 dB) in this same scenario. This example illustrates the loss in performance needed to facilitate linear complexity ML decoding (with the exception of the 2×1 MISO channel, where the Alamouti scheme is optimal).

One can also generalize this argument to the case of the non delay-optimal orthogonal signals of rates ½ by considering them as a concatenation of two delay-optimal threaded constellations. This generalization, however, does not contribute more insights, and hence, the corresponding details will be omitted for brevity.

E. Extension to MIMO Channel

Now, we extend our approach to MIMO channels (N>1). In this case, sending $L=\min(M,N)$ symbols PCU gives the maximum possible rate with a polynomial complexity ML decoding; therefore, the number of information symbols to be sent over M transmit antennas and M symbol periods (i.e., optimal delay) should be M min(M,N). In our approach, we partition the input information symbols into M streams of L symbols (i.e., $u_j \triangleq (u_{j1}, \ldots, u_{jL})^T, j=1, \ldots, M$). Each stream $u_j$ is then fed to a component encoder $\gamma_j$, where the number of coded symbols at the output of the encoder is M. The output stream from each encoder will be assigned to a different thread. The component encoders should be constructed to ensure full diversity in the absence of other threads and guarantee that the threads are transparent to each other. Without loss of generality, we will consider the following assignment of space-time cells to the $j^{th}$ thread (with the convention that time indices span $[0,M-1]$):

$$l_j = \{(\lfloor t+j-1 \rfloor_M + 1, t) : 0 \le t < T\} \text{ for } 1 \le j \le M, \quad (30)$$

where $\lfloor \cdot \rfloor_M$ denotes the mod-M operation. Note that since the number of threads is always equal to M, we avoid having periods of no transmission. The component linear encoders, i.e., $\gamma_j, j=1, \ldots, M$, are given by $$\gamma_j(u_j) = \phi_{j-1} s_j = \phi_{j-1} \tilde{M} u_j \quad (31)$$

where $\phi_{j-1}, j=1, \ldots, M$, are the Diophantine numbers that separate the different threads, and $\tilde{M}$ is an M×L matrix containing the normalized first L columns of the M×M full diversity rotation matrix M. For the special case when M is divisible by L, the matrix $\tilde{M}$ can be obtained in a slightly different way. Rather than deleting the last columns of the M×M full diversity matrix, one can obtain $\tilde{M}$ by stacking M/L full diversity matrices of dimension L×L. In this way, we decrease the algebraic degrees of the rotation matrix elements, and hence, reduce the degrees of the algebraic Diophantine numbers that achieve full diversity (see Theorem 3).

The following examples illustrate the proposed construction.

EXAMPLES

1. M Divisible by L=min(N,M)

For L=N=1, the proposed constellation reduces to that given by (27). In this case, $\tilde{M}=(1, \ldots, 1)^T$, and $\gamma_j(u_j) = \phi^{(j-1)/M} \tilde{M} u_j$ are the full diversity component encoders. For M=4, L=N=2, we have $$D_{4,4,2}(u) \triangleq \frac{1}{\sqrt{4}} \begin{pmatrix} s_{11} & \phi^{3/4} s_{42} & \phi^{2/4} s_{31} & \phi^{1/4} s_{22} \\ \phi^{1/4} s_{21} & s_{12} & \phi^{3/4} s_{41} & \phi^{2/4} s_{32} \\ \phi^{2/4} s_{31} & \phi^{1/4} s_{22} & s_{11} & \phi^{3/4} s_{42} \\ \phi^{3/4} s_{41} & \phi^{2/4} s_{32} & \phi^{1/4} s_{21} & s_{12} \end{pmatrix} \quad (32)$$

where $(S_{k1}, S_{k2})^T = M(u_{k1}, u_{k2})^T, k=1, \ldots, 4$, with M the optimal 2×2 complex or real full diversity rotation, and $u_{k1}, u_{k2} \in Z[i]$, $k=1, \ldots, 4$. One proves that $\phi = e^{i\pi/16}$ (of degree 4 over the field containing the 2×2 optimal complex rotation) achieves full diversity over all QAM constellations. Moreover, we have found the Diophantine number $\phi = e^{2i\pi/7}$ achieves a local optimum of the coding gain for the 4-QAM constellation in this configuration. Note that the benefit of using a repetition code when L divides M is the small degree of the algebraic number field that contains the rotation elements $Q(\theta)$, which has a degree of 4 here as opposed to 8 when using the optimal 4×4 complex rotation matrix. This implies a smaller degree of the Diophantine number $\phi$ that separates the different threads, giving in turn a better coding gain.

2. When M is Not Divisible by L=N

For M=3 and L=N=2, we have $$D_{3,3,2}(u) \triangleq \frac{1}{\sqrt{3}} \begin{pmatrix} s_{11} & \phi^{2/3} s_{32} & \phi^{1/3} s_{23} \\ \phi^{1/3} s_{21} & s_{12} & \phi^{2/3} s_{33} \\ \phi^{2/3} s_{31} & \phi^{1/3} s_{22} & s_{13} \end{pmatrix} \quad (33)$$

where $(S_{k2}, S_{k2}, S_{k3})^T = M(u_{k1}, u_{k2}, 0)^T$, k=1, 2, 3, M is the optimal 3×3 complex or real rotation, $u_{k1}, u_{k2}$, k=1, 2, 3, belong to the considered constellation, and $\phi$ is chosen to ensure full diversity (as formalized in Theorem 3). For example, we have found $\phi = e^{2i\pi/9}$ to give a local optima of the coding gain for the 4-QAM constellation when using the optimal 3×3 real rotation.

The desirable properties of the proposed constellations are formalized in the following theorem.

Theorem 3. If the Diophantine numbers $\{\phi_0=1, \phi_1=\phi^{1/M}, \ldots, \phi_{M-1}=\phi^{(M-1)/M}\}$ are selected to be transcendental or algebraic such that $\{1, \phi, \phi^2, \ldots, \phi^{M-1}\}$ are independent over the algebraic number field $Q(\theta)$ that contains the rotation elements and the input constellation points, then the new ST constellation will achieve full diversity. The PAR of the proposed constellations increases only linearly with the number of symbols L (i.e., $PAR_{D_{M,M,L}} \le L \times PAR_U$). Moreover, the proposed constellations achieve the optimal Euclidean distance of $$\frac{d_U^2}{L}.$$

Interestingly, if we allow for the use of generalized repetition codes, then we can obtain $D_{M,M,L}$ as the sum of L different variants of $D_{M,M,1}$. For example, with M=N=L=2, we have $$D_{2,2,2}(u) = \frac{1}{\sqrt{4}} \times \left\{ \begin{pmatrix} u_1 & \phi^{1/2} u_2 \\ \phi^{1/2} u_2 & u_1 \end{pmatrix} + \begin{pmatrix} u_3 & -\phi^{1/2} u_4 \\ \phi^{1/2} u_4 & -u_3 \end{pmatrix} \right\}. \quad (34)$$

We also note that in order to use the proposed constructions with PSK input constellations, one needs to construct full diversity algebraic rotations for these constellations (i.e., to construct full diversity rotations over $Z[w_M]$). Although previous techniques have been optimized for constellations carved from $Z[i]$, one can still utilize them to construct full diversity rotations over M-PSK by considering the Galois extension of degree M over $Q(w_M)$. For example, for M=2 the rotation $$M = \frac{1}{\sqrt{2}} \begin{pmatrix} 1 & \phi \\ 1 & -\phi \end{pmatrix}$$

guarantees full diversity for two dimensional M-PSK constellations if $\phi$ is not a quadratic residue in $Z[w_M]$ as reported in Table A.

E. Trading Diversity for Reduced PAR

Here, we impose the constraint that the PAR of the linear ST constellation is equal to that of the input constellation U. Suppose that the transmitter wants to send $L \le \min(M,N)$ symbols, drawn from U, PCU without increasing the size of U. Then, as predicted by Proposition 2, the maximum achievable transmit diversity in this case equals $$d = \left\lfloor \frac{M}{L} \right\rfloor.$$

Therefore, it suffices to consider only signaling schemes with an integer L such that M is divisible by L. In the proposed scheme, we only send the first M/L columns of the constellation matrix $D_{M,M,1}(u)$ in (27). It is easily seen that this constellation supports L=MN/d symbols PCU, and achieves a diversity advantage d, while preserving the PAR of the input constellation.

F. Trading Diversity for Reduced Complexity

We consider the scenario where a sphere decoder with $L_c$ complex dimensions is used at the receiver. Given a diversity order of d (divisible by N), let $$T \triangleq \frac{d}{N} \leq M.$$

Then, we construct an M×T TAST constellation with M threads of length T each. Consider the threading in (36), where we assign scaled full diversity diagonal algebraic space-time (DAST) constellations of length T to the different threads. To prove that this TAST constellation achieves full diversity (with the correct choice of the Diophantine number), we distinguish between two cases:

1) If T=M, then one has a square M×M TAST constellation that achieves full diversity when the Diophantine number φ is chosen to be algebraic or transcendental satisfying that $\{1, \phi, \ldots, \phi^{M-1}\}$ are algebraically independent over $Q(\theta)$, the number field containing U and the rotation entries.

2) If T<M, then to prove that this M×T matrix is full rank, we complete the constellation matrix to a square matrix by adding to thread $1_j$, the numbers $\phi^{(j-1)/M}\alpha_{j,1}$, $\phi^{(j-1)/M}\alpha_{j,2}, \ldots, \phi^{(j-1)/M}\alpha_{j,M-T}$, with $\alpha_{j,k}\neq 0\in Q(\theta)$, k=1, ... M−T, j=1, ..., M. One can prove that the resulting square matrix satisfies the full rank condition with the appropriate choice of the Diophantine numbers as in the first case above. It follows that the first T columns of this matrix are linearly independent, and therefore, the considered constellation achieves a diversity of d=TN.

One can also see that a rate of M symbols PCU is realized by the proposed constellations if a full rate (i.e., one symbol PCU) DAST constellation is used in each thread. Limiting the dimensionality of the sphere decoder to $L_c$ complex dimensions is, however, achieved by zero-setting some of the symbols. So if $L_c/T\leq\min(M,N)$ one can write $TM=L_c+n_1T+n_2$, with $n_1\geq 0$ and $0\leq n_2<T$. This suggests that if one deletes the last $n_1$ threads in our M×T TAST constellation, and sets $u_{M-n_1+1,T-n_2+1}=\ldots=u_{M-n_1+1,T}=0$, one obtains a transmission rate of $L_c/T$ symbols PCU while allowing for the polynomial complexity sphere decoder with $L_c$ dimensions. Finally, we note that deleting some threads and zero-setting some symbols in a thread does not affect the diversity gain.

The following examples illustrate the proposed scheme. Let M=3, N=3, and consider the following choices of $L_c$.

1) $L_c$=min(M,N)=3 allows for the following choices of (d,L):
   (a) (d=3, L=3): The truncated M×d TAST constellation reduces to the well-known V-BLAST system.
   (b) (d=6, L=3/2): One sends the following TAST constellation $$\frac{1}{\sqrt{3}}\begin{pmatrix} s_{11} & \phi^{2/3}s_{32} \\ \phi^{1/3}s_{21} & s_{12} \\ \phi^{2/3}s_{31} & \phi^{1/3}s_{22} \end{pmatrix} \quad (35)$$

(c) where $(s_{j1},s_{j2})^T=M(u_{j1},u_{j2})^T$, $u_{j1},u_{j2}\in U$, j=1, 2, 3, with M the 2×2 optimal rotation matrix, and φ chosen such that $\{1, \phi, \phi^2\}$ are independent over $Q(\theta)$ the field containing U and the rotation entries (e.g., when U is a QAM constellation, and M is complex, then $\theta=e^{i\pi/4}$ and one can choose $\phi=e^{2i\pi/5}$ of degree 4 over $Q(\theta)$ to ensure a diversity d). To obtain a rate of 3/2 compatible with the complexity $L_c$=3, one sets $u_{31}=u_{32}=u_{21}=0$.
   (d) (d=9, L=1): This is achieved by the TAST constellation in (27).

2) $L_c$=6 allows the following two possibilities for (d,L) (24).
   (e) (d=6, L=3): This is achieved by the constellation in (48) without zero-setting any information symbols.
   (f) (d=9, L=2): This is achieved by the constellation in (42) where $(s_{j1},s_{j2},s_{j3})_T=M(u_{j1},u_{j2},u_{j3})^T$, $u_{j1}u_{j2},u_{j3}\in U$, j=1, 2, the third thread is deleted, and φ chosen such that $\{1, \phi\}$ are independent over $Q(\theta)$ associated with rotation M.

3) $L_c$=9 allows for transmitting at full rate and full diversity by using the TAST constellation $$\frac{1}{\sqrt{3}}\begin{pmatrix} s_{11} & \phi^{2/3}s_{32} & \phi^{1/3}s_{23} \\ \phi^{1/3}s_{21} & s_{12} & \phi^{2/3}s_{33} \\ \phi^{2/3}s_{31} & \phi^{1/3}s_{22} & s_{31} \end{pmatrix} \quad (36)$$

where $(s_{j1},s_{j2},s_{j3})^T=M(u_{j1},u_{j2},u_{j3})^T$, $u_{j1},u_{j2},u_{j3}\in U$, j=1, 2, 3, with M the 3×3 optimal rotation matrix, and φ is chosen such that $\{1, \phi, \phi^2\}$ are independent over $Q(\theta)$ associated with rotation M.

One can use the same technique for optimizing the performance of the proposed constellations with the nulling and cancellation receiver (i.e., by finding the optimal pair of diversity and number of symbols PCU). Although this approach is motivated by a conjecture, the numerical results in the following section demonstrate the significant gains, compared to the V-BLAST for example, in various scenarios.

TABLE II

Comparisons Of The Mutual Information Of The TAST Constellations and The Linear Dispersion Codes at an SNR of 20 dB

| (M, N) | TAST const., T = M | LD const., T[2, Table I] | Channel Capacity |
|---|---|---|---|
| (2, 1) | 5.893 | (6.28, T = 2) | 6.28 |
| (3, 1) | 5.893 | (6.25, T = 4), (6.28, T = 6) | 6.41 |
| (3, 2) | 11.27 | (11.63, T = 4) | 12.14 |
| (4, 1) | 5.893 | (6.34, T = 4) | 6.47 |
| (4, 2) | 11.27 | (11.84, T = 6) | 12.49 |
| (8, 4) | 22.14 | (23.10, T = 8) | 24.94 |

Specific representations of the encoders and codes have been presented that, for example involve linear transformations followed by discrete Fourier transformations. More generally, any of the codes defined herein can be thought of as defining a set of constraints that will determine the output from the input. The same set of constraints may be implemented by a different physical encoder design. For the purpose of this description, an encoder is "equivalent" to another encoder if the "black box" transfer function between the input and the output of the two encoders is the same.

Numerous modifications and variations of the present invention are possible in light of the above teachings. It is therefore to be understood that within the scope of the appended claims, the invention may be practised otherwise than as specifically described herein.

We claim:

1. A transmitter comprising:
   M antennas; and
   a space-time coder, the space-time coder including:
      linear encoders configured to perform a respective full diversity linear encoding on each of P sets of K modulated symbols to generate P sets of T linearly encoded symbols; and
      a threader configured to assign each one of the P sets of T linearly encoded symbols to a corresponding one of threads of a M×T dimensional space-time code, the threads being allocated such that only one of the M antennas is used for transmission at each time interval of a given one of the threads and over time the M antennas are used substantially equally likely, wherein M>=2, 2<=P<=M, and T>=M, and wherein:
      each one of the linear encoding performed on each of the P sets of K modulated symbols is of full diversity and different from one another; and
      the M×T dimensional space-time code is of full diversity.

2. The transmitter of claim 1, wherein each one of the linear encoding performed on each of the P sets of K modulated symbols has a non-zero minimum product distance.

3. The transmitter of claim 1, wherein the linear encoders are configured to perform a respective one of linear transformations on each of the P sets of K modulated symbols to generate P sets of T linearly transformed symbols and to apply a respective one of phase rotations to each of the P sets of T linearly transformed symbols to generate the P sets of T linearly encoded symbols.

4. The transmitter of claim 3, wherein the phase rotations are different for each of the P sets of the T linearly transformed symbols.

5. The transmitter of claim 3, wherein the linear transformations are identical and unitary.

6. The transmitter of claim 3, wherein the linear transformations comprise at least in part a discrete Fourier transform (DFT).

7. The transmitter of claim 3, wherein the linear transformations comprise a product of a discrete Fourier transform (DFT) and a diagonal matrix.

8. The transmitter of claim 1, wherein the P sets of K modulated symbols are modulated according to quadrature amplitude modulation (QAM), pulse amplitude modulation (PAM), or phase shift keying (PSK).

9. A method comprising:
   performing a respective full diversity linear encoding on each of P sets of K modulated symbols to generate P sets of T linearly encoded symbols; and
   performing a threading operation to assign each one of the P sets of T linearly encoded symbols to a corresponding one of threads of a M×T dimensional space-time code; and
   transmitting the M×T dimensional space-time code using M antennas, the threads being allocated such that only one of the M antennas is used for transmission at each time interval of a given one of the threads and over time the M antennas are used substantially equally likely, wherein M>=2, 2<=P<=M, and T>=M, and wherein:
   each one of the linear encoding performed on each of the P sets of K modulated symbols is of full diversity and different from one another; and
   the M×T dimensional space-time code is of full diversity.

10. The method of claim 9, wherein each one of the linear encoding performed on each of the P sets of K modulated symbols has a non-zero minimum product distance.

11. The method of claim 9, wherein performing a respective full diversity linear encoding on each of P sets of K modulated symbols comprises:
    performing a respective one of linear transformations on each of the P sets of K modulated symbols to generate P sets of T linearly transformed symbols; and
    applying a respective one of phase rotations to each of the P sets of T linearly transformed symbols to generate the P sets of T linearly encoded symbols.

12. The method of claim 11, wherein the phase rotations are different for each of the P sets of the T linearly transformed symbols.

13. The method of claim 11, wherein the linear transformations are identical and unitary.

14. The method of claim 11, wherein the linear transformations comprise at least in part a discrete Fourier transform (DFT).

15. The method of claim 11, wherein the linear transformations comprise a product of a discrete Fourier transform (DFT) and a diagonal matrix.

16. The method of claim 9, wherein the P sets of K modulated symbols are modulated according to quadrature amplitude modulation (QAM), pulse amplitude modulation (PAM), or phase shift keying (PSK).

* * * * *

UNITED STATES PATENT AND TRADEMARK OFFICE
CERTIFICATE OF CORRECTION

PATENT NO. : 7,970,048 B2  
APPLICATION NO. : 12/497129  
DATED : June 28, 2011  
INVENTOR(S) : Mohamed O. Damen et al.

Page 1 of 1

It is certified that error appears in the above-identified patent and that said Letters Patent is hereby corrected as shown below:

- Column 4, lines 34-36: this text should not be indented as if it were an equation, but instead read as a paragraph of text.

- Column 13, line 30 (equation 1) should read:
$$X = \sqrt{\rho} \mathbf{H} C_u + W$$

- Column 14, line 19 (equation 4) should read:
$$x = \sqrt{\rho} \mathbf{H} c_u + w$$

- Column 14, line 30: "$K \geq N X T$" should read "$K \leq N X T$"

- Column 21, line 10: a --.-- should be inserted after "property)" and a new paragraph should begin before "Theorem 2. For..."

Signed and Sealed this  
Tenth Day of January, 2012

David J. Kappos  
*Director of the United States Patent and Trademark Office*